United States Patent
Yang

(10) Patent No.: US 8,286,534 B2
(45) Date of Patent: Oct. 16, 2012

(54) ASSEMBLED TRANSMISSION DEVICE WITH BI-ROTATING DIRECTIONAL INPUT AND CONSTANT ROTATING DIRECTIONAL OUTPUT

(76) Inventor: Tai-Her Yang, Dzan-Hwa (TW)

(*) Notice: Subject to any disclaimer, the term of this patent is extended or adjusted under 35 U.S.C. 154(b) by 48 days.

(21) Appl. No.: 12/902,229

(22) Filed: Oct. 12, 2010

(65) Prior Publication Data

US 2012/0085200 A1    Apr. 12, 2012

(51) Int. Cl.
*F16H 3/00* (2006.01)
(52) U.S. Cl. .................................... 74/810.1; 74/810.2
(58) Field of Classification Search ............... 74/810.1, 74/810.2
See application file for complete search history.

(56) References Cited

U.S. PATENT DOCUMENTS

| | | | | |
|---|---|---|---|---|
| 3,642,049 A * | 2/1972 | Lyman | ......................... | 160/23.1 |
| 5,690,287 A * | 11/1997 | Ono | ............................. | 242/255 |
| 6,499,576 B2 * | 12/2002 | Wafler | ....................... | 192/48.92 |
| 6,609,440 B1 * | 8/2003 | Chu | ............................. | 74/810.1 |
| 6,802,234 B2 * | 10/2004 | Hsieh | ........................... | 74/810.1 |
| 7,134,161 B2 * | 11/2006 | Campos | ........................ | 15/48.1 |

* cited by examiner

*Primary Examiner* — Ha D. Ho
(74) *Attorney, Agent, or Firm* — Bacon & Thomas, PLLC

(57) ABSTRACT

An assembled transmission device with bi-rotating directional input and constant rotating directional output can be directly installed in pipe holes of a basic through hole pipe of a vehicle, so that a vehicle to be driven that is installed with the basic through hole pipe is easy to assemble and maintain.

8 Claims, 3 Drawing Sheets

ASSEMBLED TRANSMISSION DEVICE WITH BI-ROTATING DIRECTIONAL INPUT AND CONSTANT ROTATING DIRECTIONAL OUTPUT

BACKGROUND OF THE INVENTION (a) Field of the Invention

The present invention provides an assembled transmission device with bi-rotating directional input and constant rotating directional output, which can be directly installed in pipe holes of basic through hole pipe of a vehicle, so a vehicle to be driven installed with the basic through hole pipe (P100) is easy to be assembled and maintained.

(b) Description of the Prior Art

At present, a transmission device with bi-rotating directional input and constant rotating directional output is often manufactured as an individual component then is assembled on a vehicle to be driven, so the assembly and maintenance are not convenient.

SUMMARY OF THE INVENTION

According to the present invention, an input shaft (S101) is installed in pipe holes of basic through hole pipe (P100) of a vehicle to be driven through bearings, and a support arm (A101) and a support arm (A102) are installed and clamped on the basic through hole pipe (P100) and an auxiliary pipe (P200) respectively through a screw fastening ring (LR101), a screw fastening ring (LR102), a screw fastening ring (LR201), and a screw fastening ring (LR202), and a transmission shaft (S201) is installed in the auxiliary pipe (P200) through bearings, and a chain wheel (CW201) and a chain wheel (CW101) are installed at the sane side of the input shaft (S101) and the transmission shaft (S201), wherein the chain wheel (CW101) is connected to the input shaft (S101) through a single-way transmission device (SWC102), the chain wheel (CW101) and the chain wheel (CW201) rotate in the same direction through a chain (CH100), and an output gear (G101) and an output gear (G102) are installed at the other side of the input shaft (S101) and the transmission shaft (S201), wherein the output gear (G101) is connected to the input shaft (S101) through a single-way transmission device (SWC101), and the output gear (G101) outputs the constant rotating directional rotary kinetic energy.

DESCRIPTION OF MAIN COMPONENT SYMBOLS

A101﹑A102: support arm
B101﹑B102﹑B201﹑B202: bearing
CH100: transmission chain
CW101﹑CW201: chain wheel
G101﹑G102: output gear
LR101﹑LR102﹑LR201﹑LR202: screw fastening ring
P100: basic through hole pipe
P200: auxiliary pipe
S101: input shaft
S201: transmission shaft
SWC101﹑SWC102: single-way transmission device
1010: central shaft hole
1011: rotational driving and adjusting head piece
1012: outer thread
1020: central shaft hole
1021: rotational driving and adjusting screw nut
1022: outer thread

DETAILED DESCRIPTION OF THE PREFERRED EMBODIMENTS

At present, a transmission device with bi-rotating directional input and constant rotating directional output is often manufactured as an individual component then is assembled on a vehicle to be driven, so the assembly and maintenance are not convenient.

The present invention provides an assembled transmission device with bi-rotating directional input and constant rotating directional output, which can be directly installed in pipe holes of basic through hole pipe of a vehicle, so a vehicle to be driven installed with the basic through hole pipe (P100) is easy to be assembled and maintained.

According to the present invention, an input shaft (S101) is installed in pipe holes of basic through hole pipe (P100) of a vehicle to be driven through bearings, and a support arm (A101) and a support arm (A102) are installed and clamped on the basic through hole pipe (P100) and an auxiliary pipe (P200) respectively through a screw fastening ring (LR101), a screw fastening ring (LR102), a screw fastening ring (LR201), and a screw fastening ring (LR202), and a transmission shaft (S201) is installed in the auxiliary pipe (P200) through bearings, and a chain wheel (CW201) and a chain wheel (CW101) are installed at the sane side of the input shaft (S101) and the transmission shaft (S201), wherein the chain wheel (CW101) is connected to the input shaft (S101) through a single-way transmission device (SWC102), the chain wheel (CW101) and the chain wheel (CW201) rotate in the same direction through a chain (CH100), and an output gear (G101) and an output gear (G102) are installed at the other side of the input shaft (S101) and the transmission shaft (S201), wherein the output gear (G101) is connected to the input shaft (S101) through a single-way transmission device (SWC101), and the output gear (G101) outputs the constant rotating directional rotary kinetic energy.

Figure 1:
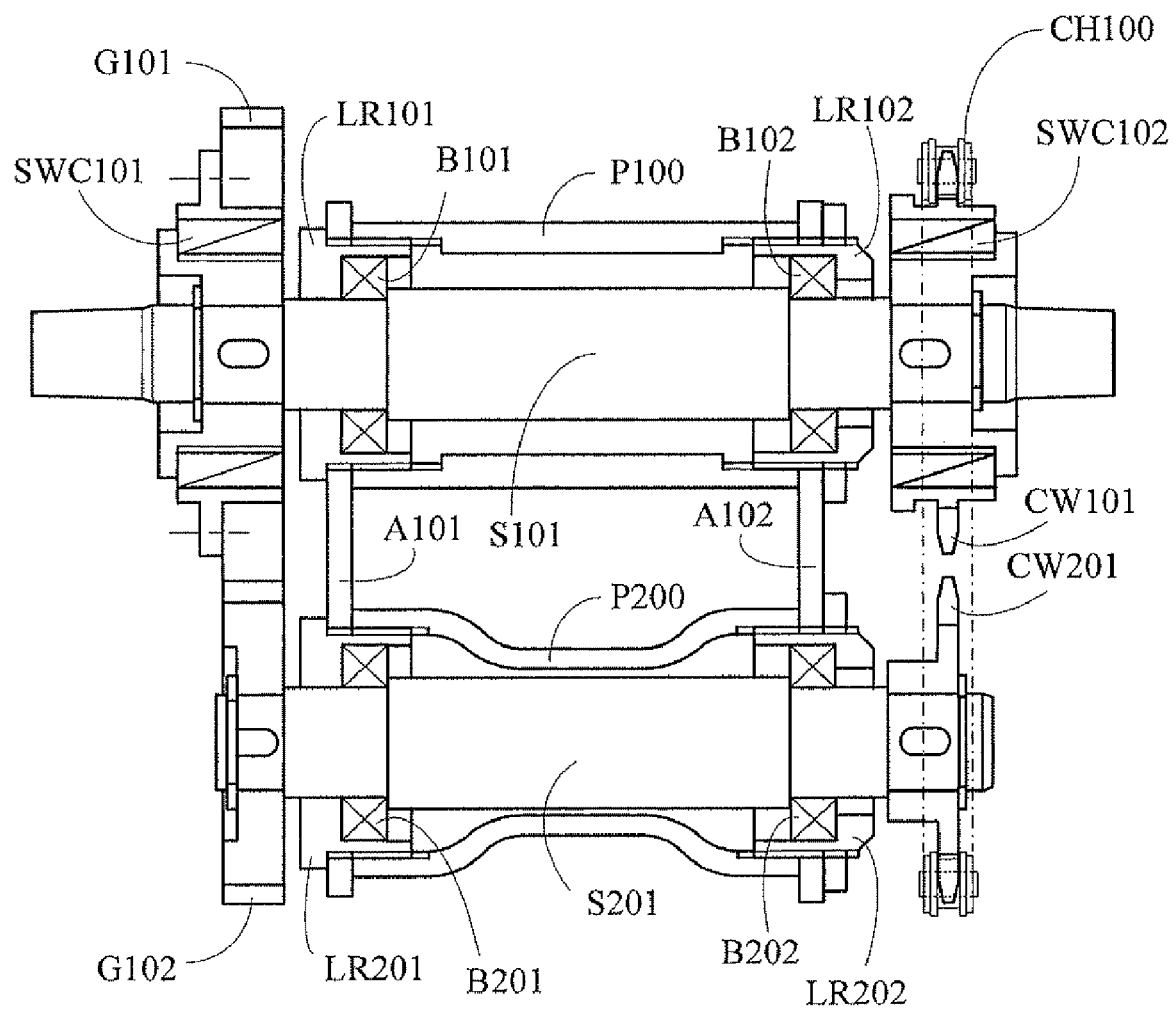
FIG. 1 is a schematic view showing the assembled structure according to the present invention.
Figure 2:
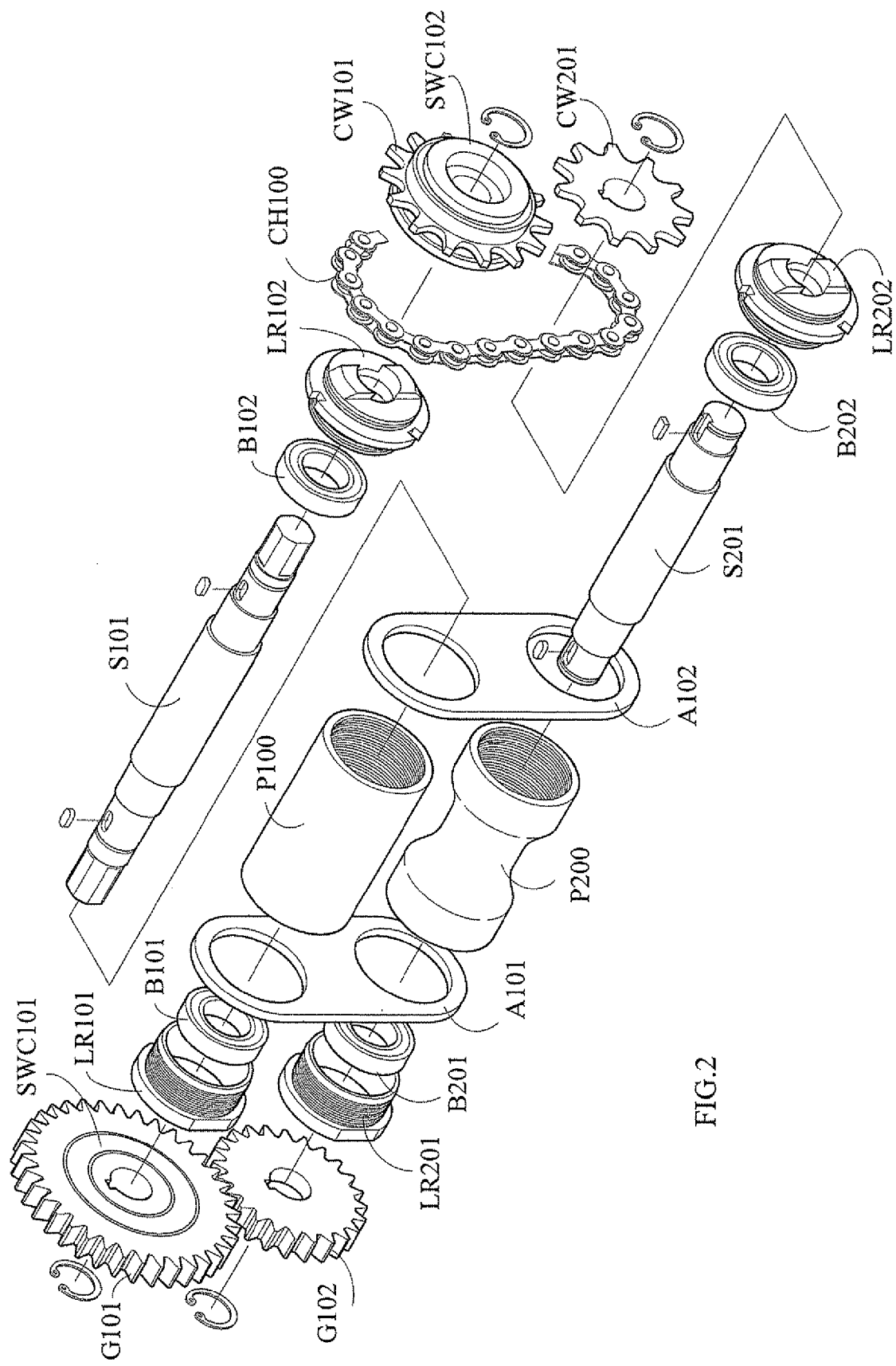
FIG. 2 is a perspective exploded view of FIG. 1.

FIG. 1 is a schematic view showing the assembled structure according to the present invention;

FIG. 2 is a perspective exploded view of FIG. 1;

As shown in FIG. 1 and FIG. 2, it mainly consists of:

basic through hole pipe (P100): which is a pipe shaped structure and installed in a vehicle, the basic through hole pipe (P100) has pipe holes for being through-installed with the bearings (B101), (B102), so the input shaft (S101) can be installed and rotated thereon, the pipe holes at two ends of the basic through hole pipe (P100) has inner thread or fastening structures, and the screw fastening ring (LR101) and the screw fastening ring (LR102) respectively penetrate fastening holes of the support arm (A101) and the support arm (A102) so as to be rotated and fastened at the two ends of the basic through hole pipe (P100);

input shaft (S101): which is a shaft shaped structure and is through-installed at the pipe holes at two ends of the basic through hole pipe (P100) through the bearing (B101) and the bearing (B102), and is through the screw fastening ring (LR101) and the screw fastening ring (LR102) being installed and clamped with the support arm (A101) and the support arm (A102) so as to be fastened at the pipe holes at two ends of the basic through hole pipe (P100);

auxiliary pipe (P200): which is a pipe shaped structure and has pipe holes for being through-installed with the bearings (B201), (B202), so the transmission shaft (S201) can be installed and rotated thereon, the pipe holes at two ends of the auxiliary pipe (P200) have inner thread or fastening structures, and the screw fastening ring (LR201) and the screw fastening ring (LR202) respectively penetrate the fastening holes of the support arm (A101) and the support arm (A102) so as to be fastened at the two ends of the auxiliary pipe (P200);

support arm (A101): which is a support arm structure with plate shaped configuration, two ends thereof respectively have a through hole for allowing the screw fastening ring (LR101) and the screw fastening ring (LR201) to penetrate, and the support arm (A101) is clamped and fastened at the same side of the basic through hole pipe (P100) and the auxiliary pipe (P200) for combining the basic through hole pipe (P100) and the auxiliary pipe (P200);

support arm (A102): which is a support arm structure with plate shaped configuration, two ends thereof respectively have a through hole for allowing the screw fastening ring (LR102) and the screw fastening ring (LR202) to penetrate, and the support arm (A102) is clamped and fastened at the other side of the basic through hole pipe (P100) and the auxiliary pipe (P200) for combining with the basic through hole pipe (P100) and the auxiliary pipe (P200);

screw fastening ring (LR101), (LR102), (LR201), (LR202): which is a step-shaped annular structure, for being fastened at the two ends of the basic through hole pipe (P100) and the auxiliary pipe (P200) having the screw or fastening structures therein, for clamping the support arm (A101) and the support arm (A102) and fastening at two ends of the basic through hole pipe (P100) and the auxiliary pipe (P200);

single-way transmission device (SWC101), (SWC102): which is an over running clutch constituted by a single-way transmission mechanism device;

chain wheel (CW101), (CW201): constituted by a chain wheel or tooth shaped pulley, and combined at the same side of the input shaft (S101) and the transmission shaft (S201) through structures of chains, pins, special-shaped holes and shafts, wherein the chain wheel (CW101) is connected to the input shaft (S101) through the single-way transmission device (SWC102), and the chain wheel (CW101) and the chain wheel (CW201) rotates in the same direction through the transmission chain (CH100) or tooth shaped pulley;

output gear (G101), (G102): constituted by a gear, and combined at the other side of the input shaft (S101) and the transmission shaft (S201) through structures of chains, pins, special-shaped holes or shafts, wherein the output gear (G101) is connected to the input shaft (S101) through the single-way transmission device (SWC101), so the output gear (G101) and the output gear (G102) perform transmission in opposite rotation directions; wherein the output gear (G101) is served to operate for providing the constant rotating directional output function.

In the assembled transmission device with bi-rotating directional input and constant rotating directional output of the present invention, the screw fastening ring (LR101) and the screw fastening ring (LR102) served to fasten the input shaft (S101), the screw fastening ring (LR201) and the screw fastening ring (LR202) served to fasten the transmission shaft (S201) can be constituted to an integral type structure or the adjustable screw type structure.

Figure 3:
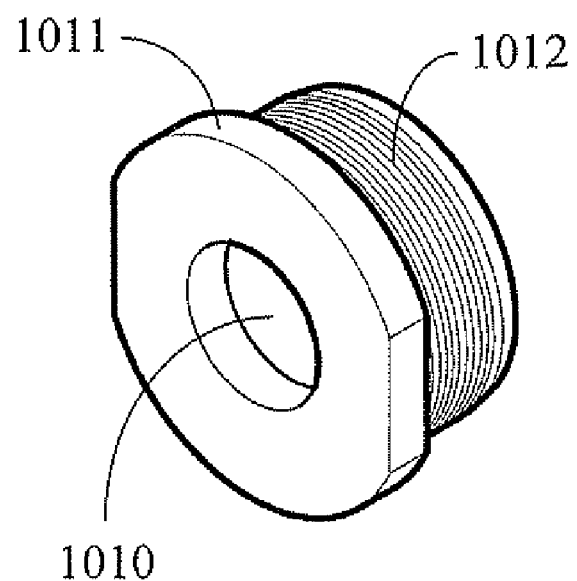
FIG. 3 is a schematic view showing an integral type structure having screw fastening rings according to one embodiment of the present invention.

FIG. 3 is a schematic view showing an integral type structure having screw fastening rings according to one embodiment of the present invention;

As shown in FIG. 3, it is constituted by a step-like structure having a central shaft hole (1010), one end thereof being provided with a rotational driving and adjusting head piece (1011), the other end thereof being provided with an outer thread (1012).

Figure 4:
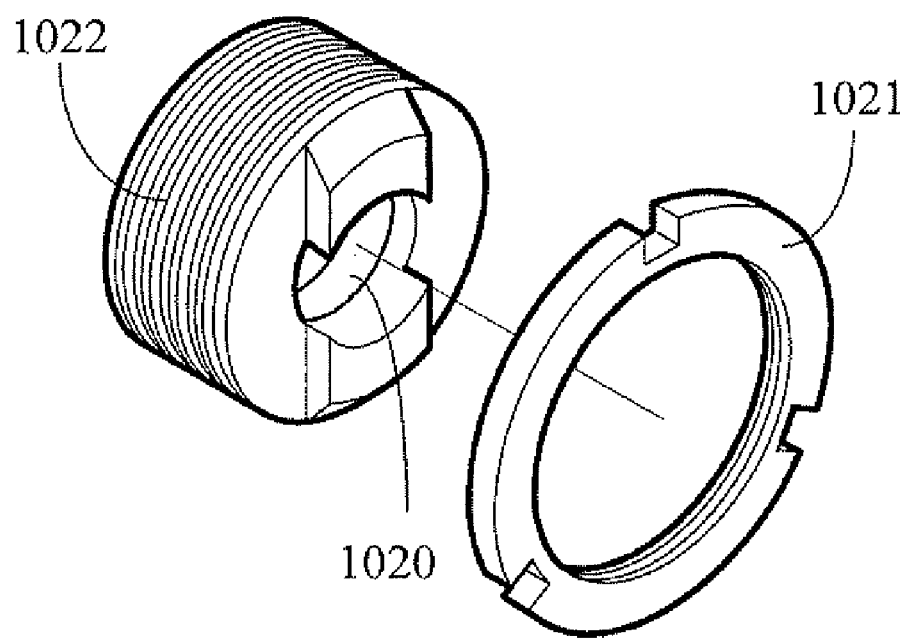
FIG. 4 is a schematic view showing a screw adjustable type structure having screw fastening rings according to one embodiment of the present invention.

FIG. 4 is a schematic view showing a adjustable screw type structure having screw fastening rings according to one embodiment of the present invention;

As shown in FIG. 4, it is constituted by a tubular screw pipe installed with an outer thread (1022) and having a central shaft hole (1020), and wherein the outer circumference is served to be fitted with a rotational driving and adjusting screw nut (1021).

In the assembled transmission device with bi-rotating directional input and constant rotating directional output of the present invention, the screw fastening ring (LR101) and the screw fastening ring (LR102) served to fasten the input shaft (S101), and the screw fastening ring (LR201) and the screw fastening ring (LR202) served to fasten the transmission shaft (S201) can be constituted to a structure in which a part thereof being the integral type and the other part thereof being the adjustable screw type.

In the assembled transmission device with bi-rotating directional input and constant rotating directional output of the present invention, it is capable of being further constituted to the following structures in the practical applications, include:

In the assembled transmission device with bi-rotating directional input and constant rotating directional output of the present invention, the chain wheel (CW101) and the chain wheel (CW201) and the transmission chain (CH100) are installed at the same side, the output gear (G101) and the output gear (G102) are installed at the same side; wherein when the chain wheel (CW101) and the chain wheel (CW201) and the transmission chain (CH100) are installed at the left side, the output gear (G101) and the output gear (G102) are installed at the right side, and vice versa;

In the assembled transmission device with bi-rotating directional input and constant rotating directional output of the present invention, when in practical application, and when the function of bi-rotating directional input and constant rotating directional output being kept, the single-way transmission device (SWC101) and the single-way transmission device (SWC102) can be installed between any two of the four transmission wheels including the chain wheel (CW101), the chain wheel (CW201), the output gear (G101) and the output gear (G102), and the rotating shaft combined therewith;

In the assembled transmission device with bi-rotating directional input and constant rotating directional output of the present invention, the auxiliary pipe (P200) further includes a structure in which the middle portion having a smaller diameter;

In the assembled transmission device with bi-rotating directional input and constant rotating directional output of the present invention, the auxiliary pipe (P200) includes a parallel cylindrical pipe structure.

The invention claimed is:

1. As assembled transmission device with bi-rotating directional input and constant rotating directional output, wherein an input shaft (S101) is installed in pipe holes of a basic through hole pipe (P100) of a vehicle to be driven through first bearings, and a support art (A101) and a support arm (A102) are installed and clamped on the basic through hole pipe (P100) and an auxiliary pipe (P200) respectively through a screw fastening ring (LR201), and a screw fastening ring (LR202), and a transmission shaft (S201) is installed in the auxiliary pipe (P200) through second bearings, and a chain wheel (CW201) and a chain wheel (CW101) are installed at the same side of the input shaft (S101) and the transmission shaft (S201) through a single-way transmission device (SWC102), the chain wheel (CW101) and the chain wheel (CW201) rotate in the same direction through a chain (CH100), and an output gear (G101) and an output gear (G102) are installed at the other side of the input shaft (S101) and the transmission shaft (S201), wherein the output gear (G101) is connected to the input shaft (S101 through a single-way transmission device (SWC101), and the output gear (G101) outputs constant rotating direction rotary kinetic energy, said assembled transmission device comprising:

said basic through hole pipe (P100): which is a pipe shaped structure installed in the vehicle, the basic through hole pipe (P100) having the pipe holes for being through-installed with the first bearings (B101), (B102), so the input shaft (S101) can be installed and rotated thereon, the pipe holes at two ends of the basic through hole pipe (P100) having inner thread or fastening structures, and the screw fastening ring (LR101) and wherein the screw fastening ring (LR102) respectively penetrate fastening holes of the support arm (A101) and the support arm (A102) so as to be rotated and fastened at the two ends of the basic through hole pipe (P100);

said input shaft (S101): which is a shaft shaped structure and through-installed at the pipe holes at two ends of the basic through hole pipe (P100) through the bearing (B101) and the bearing (B102), and is through the screw fastening ring (LR101) and the screw fastening ring (LR102) being installed and clamped with the support arm (A101) and the support arm (A102) so as to be fastened at the pipe holes at two ends of the basic through hole pipe (P100);

said auxiliary pipe (P200): which is a pipe shaped structure and has pipe holes for being through-installed with the bearings (B2010, (B202), so the transmission shaft (S201) can be installed and rotated thereon, the pipe holes at two ends of the auxiliary pipe (P200) having inner thread or fastening structures, and wherein the screw fastening ring (LR201) and the screw fastening ring (LR202) respectively penetrate the fastening holes of the support arm (A1010 and the support arm (A102) so as to be fastened at the two ends of the auxiliary pipe (P200);

said support arm (A101): which is a support arm structure with a plate shaped configuration, two ends thereof respectively have a through hole for allowing the screw fastening ring (LR101) and the screw fastening ring (LR201) to penetrate, and wherein the support arm (A101) is clamped and fastened at the same side of the basic through hole pipe (P100) and the auxiliary pipe (P200) for combining the basic through hole pipe (P100) and the auxiliary pipe (P200);

said support arm (A102): which is a support arm structure with a plate shaped configuration, two ends thereof respectively having a through hole for allowing the screw fastening ring (LR102) and the screw fastening ring (LR202) to penetrate, and wherein the support arm (A102) is clamped and fastened at the other side of the basic through hole pipe (P100) and the auxiliary pipe (P200) for combining with the basic through hole pipe (P1000 and the auxiliary pipe (P200);

said screw fastening rings (LR101), (LR102), (LR201), (LR202): each of which is a step-shaped annular structure, for being fastened at the two ends of the basic through hole pipe (P100) and the auxiliary pipe (P200) having the screw or fastening structures therein, for clamping the support arm (A101) and the support arm (A102) and fastening at two ends of the basic through hole pipe (P100) and the auxiliary pipe (P200);

said single-way transmission devices (SWC101), (SWC102): each of which is an over running clutch constituted by a single-way transmission mechanism device;

chain wheels (CW101), (CW201): each of which is constituted by a chain wheel or tooth shaped pulley, and combined at a same side of the input shaft (S101) and the transmission shaft (S201) through structures of chains, pins, special-shaped holes and shafts, wherein the chain wheel (CW101) is connected to the input shaft (S101) through the single-way transmission device (SWC102, and the chain wheel (CW101) and the chain wheel (CW201) rotates in the same direction through the transmission chain (CH100) or the tooth shaped pulley;

said output gears (G101), (G102): each of which is constituted by a gear, and combined at the other side of the input shaft (S101) and the transmission shaft (S201) through structures of chains, pins, special-shaped holes or shafts, wherein the output gear (G101) is connected to the input shaft (S101) through the single-way transmission device (SWC101), so the output gear (G101) and the output gear (G102) perform transmission in opposite rotation directions; wherein the output gear (G101) serves to provide a constant rotating directional output function.

2. The assembled transmission device with bi-rotating directional input and constant rotating directional output according to claim 1, wherein the screw fastening ring (LR101) and the screw fastening ring (LR102) serve to fasten the input shaft (S101), the screw fastening ring (LR201) and the screw fastening ring (LR202) that serve to fasten the transmission shaft (S201) is constituted by an integral structure; and the assembled transmission device is constituted by a step-like structure having a central shaft hole (1010), one end of the central shaft hole (1010) being provided with a rotational driving and adjusting head piece (1011), the other of the central shaft hole (1010) being provided with an outer thread (1012).

3. The assembled transmission device with bi-rotating directional input and constant rotating directional output according to claim 1, wherein the screw fastening ring (LR101) and the screw fastening ring (LR102) that serve to fasten the transmission shaft (S201) are each constituted by a screw adjustable structure constituted by a tubular screw pipe installed with an outer thread (1022) and having a central shaft hole (1020) and an outer circumference is arranged to be fitted with a rotational driving and adjusting screw nut (1021).

4. The assembled transmission device with bi-rotating directional input and constant rotating directional output according to claim 1, wherein the screw fastening ring (LR101) and the screw fastening ring (LR102) serve to fasten the input shaft (S101), and the screw fastening ring (LR201) and the screw fastening ring (LR202) that serve to fasten the transmission shaft (S201) can be constituted by a structure in which a part thereof is integral and the other part thereof is screw adjustable.

5. The assembled transmission device with bi-rotating directional input and constant rotating directional output according to claim 1, wherein the chain wheel (CW101) and the chain wheel (CW201) and the transmission chain (CH100) are installed at the same side, and the output gear (G101) and the output gear (G102) are installed at the same side; wherein when the chain wheel (CW101), the chain wheel (CW201), and the transmission chain (CH100) are installed at the left side, the output gear (G101) and the output gear (G102) are installed at the right side, and vice versa.

6. The assembled transmission device with bi-rotating directional input and constant rotating directional output according to claim 1, wherein the single-way transmission device (SWC102) can be installed between any two of the four transmission wheels including the chain wheel (CW101), the chain wheel (CW201), the output gear (G101) and the output gear (G102), and the rotating shaft is combined therewith, while a function of the bi-rotating directional input and constant rotating directional output is maintained.

7. The assembled transmission device with bi-rotating directional input and constant rotating directional output according to claim 1, wherein the auxiliary pipe (P200) further includes a structure in which the middle portion has a smaller diameter.

8. The assembled transmission device with bi-rotating directional input and constant rotating directional output according to claim 1, wherein the auxiliary pipe (P200) includes a parallel cylindrical pipe structure.

* * * * *